Patented Aug. 26, 1952

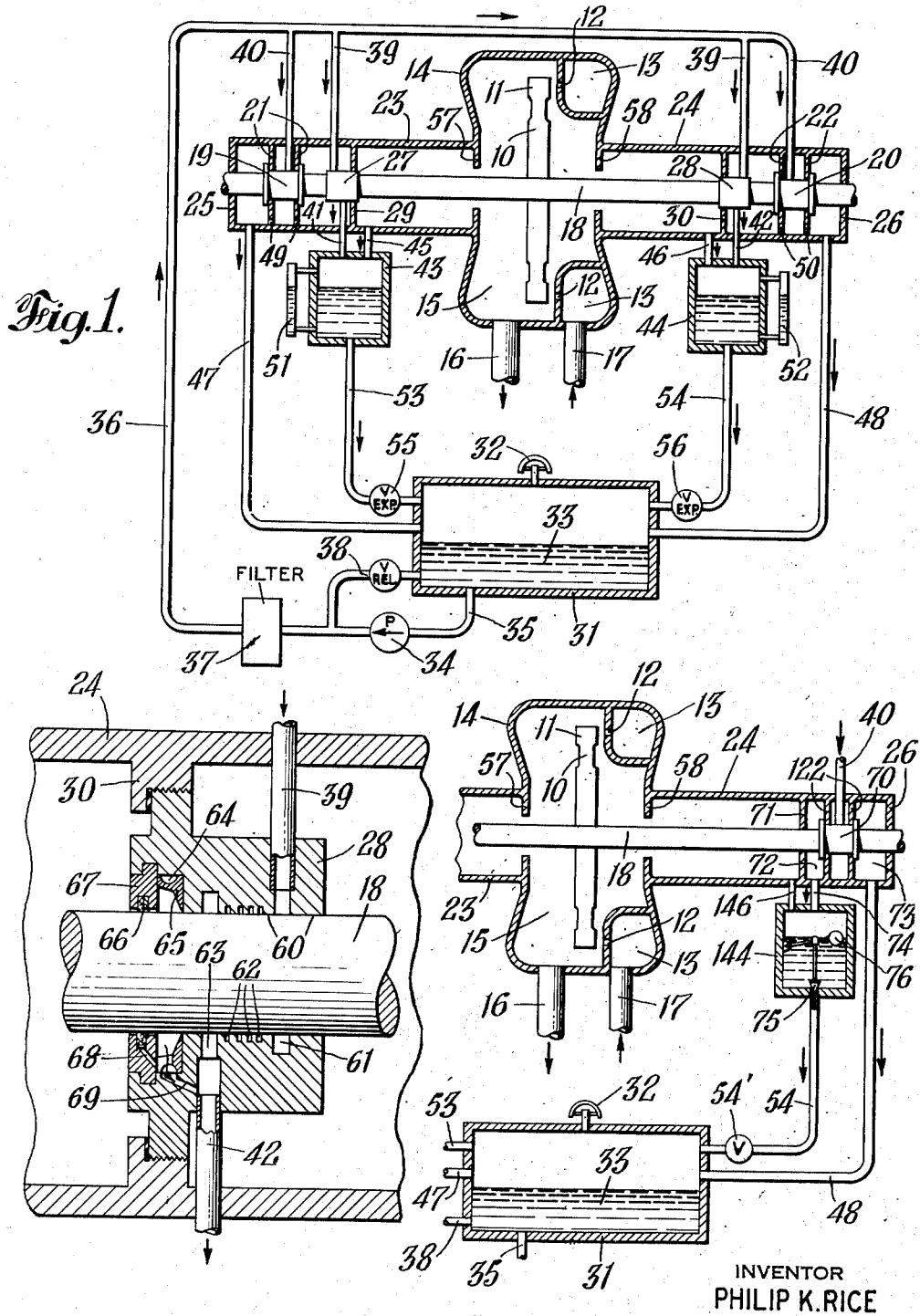

2,608,380

UNITED STATES PATENT OFFICE 2,608,380

SHAFT SEAL FOR LOW-TEMPERATURE EXPANSION ENGINES

Philip K. Rice, Kenmore, N. Y., assignor, by mesne assignments, to Union Carbide and Carbon Corporation, a corporation of New York Application December 3, 1947, Serial No. 789,430

5 Claims. (Cl. 253—39)

1

This invention relates to an expansion turbine for producing low temperature refrigeration, and more particularly to shaft seals for such turbines.

Principal objects of the present invention are to provide an improved construction in an air or gas turbine operable to produce low temperature refrigeration by the expansion of air or gas with the production of external work so that such turbine shall have a high refrigeration-producing efficiency.

More specific objects of the invention are to provide in such an expansion turbine, a shaft bearing arrangement which has low friction and may be lubricated with liquid lubricants; to provide in such a turbine, a bearing arrangement and shaft sealing means that avoids heating the expanded gas or air and which prevents escape of cold expanded gas or air toward the bearing and to the atmosphere.

The above and other objects and novel features of this invention will become apparent from the following specification and the accompanying drawings, in which:

Fig. 1 is a schematic view of a cross-section through an exemplary air expansion turbine embodying improvements according to the present invention;

Fig. 2 is a fragmentary view on an enlarged scale of a cross-section through the seal sleeve of Fig. 1; and Fig. 3 is a similar view of another embodiment of the invention in which a lubricant film on the bearing surface of the main bearing is employed for sealing.

An impulse type turbine having an impulse wheel mounted on a shaft for rotation within a wheel housing or casing may be employed advantageously for expanding air or gas with the production of external work to efficiently produce low temperature refrigeration. Ordinary impulse turbines employ short shafts with bearings close to the wheel and a customary form of shaft seal to prevent excessive leakage of expanded fluid from the turbine casing along the shaft.

The customary shaft seals usually depend upon friction surfaces and therefore create frictional heat. Such heat tends to enter the expanded fluid if same is at a low temperature, and in a turbine for the production of refrigeration this would reduce the refrigeration efficiency. Labyrinth seals have also been employed in steam turbines, but if made with very close clearance to keep the leakage at a low value, friction is usually created, especially in constructions where temperature changes are encountered considerable friction may occur. If labyrinth seals are employed in an expansion turbine and are made with customary clearance, some leakage of expanded fluid takes place and such leakage not only affects the refrigeration efficiency but also chills the seal and unduly cools the bearing. With very low temperatures the lubrication of shaft bearings becomes a serious problem, as ordinary lubricants become frozen at the temperatures reached. Thus the bearings are preferably located at a distance from the impulse wheel in a warm region. Leakage of cold gas along the shaft toward the bearings, however, would chill the bearing and nullify this solution of the bearing problem.

According to the present invention the main shaft bearings are positioned at a distance from the turbine wheel such that if there is no leakage of cold expanded air through them they remain at the desired warm operating temperatures and can be efficiently lubricated with available liquid lubricants. The prevention of air leakage is accomplished by providing a liquid sealing film around the shaft. This is effected in one embodiment (Fig. 3) by supplying liquid lubricant to the interior of the bearing surface in the main bearing or bearings, such main bearings being of the sleeve type and the bearing surface constituting a film retaining surface around the shaft. The lubricant is supplied under a pressure higher than the pressure of the expanded air and in volumes sufficient to keep the bearing full. Excess lubricant escaping from either side of the bearing is collected in a manner that avoids the escape of expanded air, and the collected lubricant is repumped to the bearing surfaces. In another embodiment (Fig. 2) there is provided a seal sleeve on the wheel side of the main bearing, which sleeve has a film retaining surface around the shaft, and the space between this film retaining surface and the shaft is supplied with the lubricant under pressure.

Referring now to the drawings, and particularly to Fig. 1, which illustrates an embodiment of the invention applied to an impulse type of air expansion turbine, the impulse turbine wheel is indicated at 10 as having an annular row of blades 11 against which jets of air are impinged from nozzle orifices 12 which receive air under pressure from an annular channel 13 which is formed in one side of the turbine wheel casing 14 in which the wheel 10 revolves. The casing 14 provides a space 15 for collecting the expanded air that leaves the blades 11. Such expanded air is conducted from the chamber 15 through a conduit 16 that may conduct it to a place of use such as, for example, an apparatus that separates air into nitrogen and oxygen components by low temperature rectification. The compressed air is supplied to the channel 13 through a conduit 17. The turbine wheel is mounted for rotation on a long shaft 18 which is supported for rotation in bearings 19 and 20 that are located on either side of the wheel 10 and casing 14 and at a substantial distance therefrom. The shaft 18 is preferably made of a metal having low heat conductivity, for example, stainless steel. The bearings 19 and 20 are preferably supported by partitions 21 and 22 formed in and near the outer ends of casing extensions 23 and 24. In the embodiment of Fig. 1, bearings 19 and 20 may be of any desired type, for example, sleeve, ball or roller bearings. The outer ends of the extensions 23 and 24 are preferably closed by caps 25 and 26 which have a hole through the center for the passage of the shaft 18, since at least one end of the shaft 18 must be coupled to a device for absorbing the power developed, which is equivalent to the external work produced by the expansion of the air. On the inboard or wheel side of the bearings 19 and 20 there are located seal sleeves 27 and 28 which are mounted in partitions 29 and 30 formed in the casing extensions 23 and 24. The preferred construction of the seal sleeves 27 and 28 is illustrated in Fig. 2 and will be described hereinafter.

In accordance with the invention a liquid lubricant under pressure is fed to the seal sleeves 27 and 28 as well as to the main bearings 19 and 20. This is accomplished by a lubricant supply system including a lubricant receiver 31 having a combined filling opening and atmospheric vent 32 and containing a supply of liquid lubricant 33. A motor-driven pump 34, preferably of the rotary type suitable for pumping liquid lubricants, is connected to receive lubricant from the receiver 31 through a connection 35 and discharge it into a conduit 36. In the conduit 36 there is preferably interposed a filter 37 and a relief valve by-pass connection 38 that by-passes liquid lubricant back to the receiver 31 if the pump discharge pressure should exceed a desired set value. The pressure in the conduit 36 is preferably sufficiently in excess of the expanded air pressure to prevent any air leakage past seal 27 or 28. Branch connections 39 and 40 from the conduit 36 conduct the liquid lubricant into the seal sleeves 27 and 28 and the bearing surface or bearing elements in the bearings 19 and 20. From the sleeves 27 and 28 the lubricant flows through drain connections 41 and 42 into chambers 43 and 44. The feeding of lubricant to the main bearings 19 and 20 in Fig. 1 is optional, for example, if they are ball bearings they may be provided with a lubricant sprayed into the bearing. If any liquid lubricant should escape at the inboard or wheel side of the sleeves 27 and 28 it will drop to the bottom of the casing extensions 23 and 24, for which drain connections 45 and 46 are provided between the chambers 43 and 44 and the casing extensions on the inboard side of the partitions 29 and 30. The drain connections 45 and 46 also serve to insure that the chambers 43 and 44 operate at the exhaust pressure of the turbine which usually is above atmospheric.

Lubricant that drains from the ends of the main bearings 19 and 20 or from the outboard side of the seal sleeves 27 and 28 collects in the casing extensions 23 and 24 on the outer side of the partitions 29 and 30. Such drainage is removed by drain conduits 47 and 48 connected directly to the lubricant receiver 31, since this portion of the casing extension is at atmospheric pressure. To facilitate such drainage the partitions 21 and 22 have passages 49 and 50 therethrough at their lower ends. The chambers 43 and 44 are preferably provided with liquid level indicating means such as sight glasses 51 and 52 so that a level of liquid may be always maintained therein to prevent the escape of expanded air when liquid lubricant is drained from the chambers 43 and 44. Lubricant drainage is accomplished by conduits 53 and 54 connecting the bottom of the chambers 43 and 44 with the receiver 31. Such conduits have interposed therein control valves 55 and 56 which may be of the expansion valve type so as to be adjusted to pass liquid lubricant at the desired rate. In order to reduce to a minimum the circulation of cold expanded air within the casing extensions 23 and 24 there are preferably provided partitions 57 and 58 at the inner or casing ends of the extensions 23 and 24.

The seal sleeves 27 and 28 may have any suitable construction, for example, they may simply be of sleeve type providing a lubricant film about the shaft 18. The preferred construction, however, is shown in Fig. 2. The sleeve 28 illustrated in Fig. 2 is suitably mounted, for example, threaded into the partition 30 of the casing extension 24. The sleeve 28 has a film retaining surface 60 surrounding the shaft 18 and such film retaining surface may be divided into two portions by an annular channel 61. The channel 61 is connected to receive lubricant from the branch 39. If desired, the inboard portion of the film retaining surface 60 may also be provided with a series of small annular grooves 62 to aid in the sealing effect. On the inboard end of the film retaining surface 60 there is formed an annular channel 63 into which the drain connection 42 is connected. There may also be provided a means for impeding the movement of lubricant along the shaft 18 in the direction of the wheel 10. This is especially desirable where there is a small amount of endwise movement of the shaft 18. Two such additional lubricant sealing means are illustrated, both being mounted within a counterbore 64 at the inboard end of the sleeve 28. One of these is a ring 65 mounted in the bottom of the counterbore and having a narrow inner edge contacting the shaft 18. The second is a ring of resilient fibrous material 66 such as felt mounted in a channel in the inner periphery of a retaining ring 67 that closes the outer end of the counterbore 64. At a low point of the felt ring 66 there is a drain hole 68 into the counterbore space and the counterbore space about the ring 65 is drained by a passage 69 connecting it to the drain connection 42.

The operation of this embodiment of the invention requires that the pump 34 be started just before the turbine is placed in operation. The pump 34 maintains a supply of liquid lubricant under a desired constant pressure in the conduit 36. Such lubricant feeds to the intermediate points of the bearings 19 and 20 through branches 40 and to the channel 61 between the two portions of the film retaining surface 60 in the sleeve 28 through the branch 39. The lubricant entering the clearance space between the shaft 18 and the film retaining surface 60 provides a liquid film between the sleeve 28 and the shaft 18, so that friction is reduced to a very low value. The liquid lubricant pressure is such that the film on the film retaining surface is maintained against any pressure difference between the inboard and outboard ends of the sleeve 28. A part of the lubricant supplied to the sleeve 28 will drain from the outboard end into the casing extension 24 on the right (outboard) side of the partition 30 and will flow through the passages 50 to the drain 48 and into the receiver 31. Another part of the excess liquid lubricant will flow along the film retaining surface 60 to the channel 63 and drain into the chamber 44 through connection 42. Such lubricant collected in the chamber 44 may be drained either periodically or substantially constantly by the conduit 54 and the control or expansion valve 56. If any heat should be developed at the film retaining surface 60 it would tend to be carried off by the circulation of liquid lubricant through the seal sleeve 28. Some flow of liquid lubricant is preferable and to this end the diametral clearance between the shaft 18 and the film retaining surface 60 is preferably made between .006 inch to .020 inch. When the shaft is made of stainless steel the portions journalled within the sleeve type bearings and in the sleeves 27 and 28 are preferably chromium plated. Ordinarily the difference of pressure between the inboard and outboard sides of the sleeve 28 would prevent any flow of liquid lubricant toward the inboard side of the sleeve 28. However, the seal rings 65 and 66 are provided to prevent creepage, especially when the turbine is not operating to expand air.

Referring now to Fig. 3, this alternative embodiment of the invention differs from the first embodiment in the omission of the seal sleeve 28 and in the use of a main bearing of the sleeve type to provide the liquid lubricant sealing film, the bearing surface functioning also as a film retaining means about the shaft. Corresponding parts are indicated by similar reference numerals, and since both shaft bearings may be of similar construction, only the right-hand end is shown and described. As previously stated, the main bearing 70 is of the sleeve type and may have an inner bearing surface similar to the film retaining surface 60 in the sleeve 28. The diametral clearance between the shaft and the bearing surface, however, is preferably .004 to .010 inch and the use of grooves 62 is optional. Preferably there would be a channel corresponding to the channel 61. If desired this channel could have a longitudinal portion cut into the bearing surface to obtain optimum distribution of the lubricant over the bearing surface. The main bearing 70, which is preferably spool-shaped, is mounted in the partitions 122 near the outer end of the housing extension 24 so as to resist axial thrust forces and the lubricant inlet branch 40 is connected to the bearing to communicate with the bearing surface therein or the channel in the bearing. Spaced a short distance from the inboard end of the bearing 70 is a partition 71 in the housing extension 24, which partition fits closely about the shaft 18. If preferred, a felt sealing ring similar to 66 may be mounted in the partition 71 around the shaft 18. Thus there are formed collecting chambers 72 and 73 on either side of the bearing 70. The outer chamber 73 is drained by the drain conduit 48 connected with the receiver 31. The inner chamber 72 is drained by a connection 74 to the lubricant collecting chamber 144. The connection 146 between chamber 144 and extension 24 serves mainly as a pressure equalizing connection. A drain pipe 54 connects the bottom of chamber 144 with the receiver 31. This drain pipe may have a stop valve 54' therein. Drainage of the chamber 144 is automatically effected by a float operated valve 75 that controls the opening into the conduit 54 and is operated by a float 76 pivotally mounted in the chamber 144.

In this form of the invention the liquid lubricant is supplied under a pressure in excess of the expanded air pressure through the branch conduit 40 into the bearing surface of the bearing 70 and in sufficient quantity to keep the bearing full of lubricant so that lubricant will flow from both sides of the bearing 70. Lubricant that escapes from the inboard side will be relatively smaller in amount because it escapes against the expanded air pressure. The partition 71 prevents flow of lubricant in the housing extension 24 toward the wheel and the lubricant that is collected in the chamber 72 flows into the chamber 144 from which it is automatically discharged into the receiver 31. Lubricant that escapes into the outer chamber 73 which is at substantially atmospheric pressure will drain by gravity through the conduit 48 into the receiver 31. The pump and filter arrangement may be similar to that shown and described in connection with Fig. 1.

It will be seen that by providing a long flexible shaft with an impulse wheel in the center thereof, and having the wheel and shaft accurately balanced dynamically, such wheel and shaft will spin on its own axis without excessive vibration so that a short stiff shaft is not needed, and it is possible to position the shaft bearings at a distance from the very cold wheel 10 and casing 14. By avoiding all leakage at the outer end of the casing extensions 23 and 24, a substantially dead pocket of expanded air is trapped in the casing extensions between the partitions 57 and 58 and the partitions 29 and 30. Therefore there will be very little heat transfer between the seals 27 and 28 and the casing 14. Such heat as may be transferred by conduction is limited by the low thermal conductivity of the shaft 18 and casing extensions 23 and 24 and by the fact that shaft 18 is long and of small diameter. The seal that prevents escape of expanded air is provided by a liquid film which prevents all leakage and at the same time operates substantially without friction. Hence very little heat is generated at the seal, whether it be the sealing sleeve of Fig. 1 or the main bearing of Fig. 3. What little heat may be generated is sufficient to balance the small amount of heat that escapes toward the cold end of the extensions 23 and 24. If such frictional heat is insufficient to maintain the sealing sleeve or main bearing at the correct operating temperature, the circulation of lubricating liquid through the bearing and through exposed piping and an exposed receiver 31 effectively supplies the necessary small additional amount of heat so that the bearing will always remain at a temperature desired for efficient lubrication.

It will be seen that certain features of the invention may be used without others and that changes in details of the apparatus may be made without departing from the principles of the invention, for example, the positions of the main bearing and sealing sleeve in relation to the turbine wheel may be exchanged, i. e., the sealing sleeves 27 and 28 would be on the outboard side of the bearings 19 and 20 in Fig. 1 and close to the bearings and the main bearing would still remain at the desired operating temperature because the seal would prevent flow of cold air or gas in the direction toward the bearing. In such an arrangement, the positions of the partitions 29 and 30 would also be interchanged with the partitions 21 and 22 respectively and drains 41 and 42 would connect to the intervening space.

What is claimed is:

1. In an expansion turbine for producing low temperature refrigeration and having an impulse wheel disposed within a casing and mounted on a long flexible shaft, a shaft sealing means mounted in an extension of said casing about the shaft, said sealing means being disposed at a substantial distance from the wheel; a partition near the wheel through which the shaft passes, said partition and extension defining an elongated space around the shaft between said partition and said sealing means, said space between the shaft and casing extension containing quiescent expanded fluid under superatmospheric pressure the construction and arrangement being such as to maintain heat transfer from the sealing means toward the wheel at a desired low value; and means for preventing escape of such expanded fluid along the shaft comprising a film retaining surface of said sealing means completely surrounding a portion of said shaft, means for supplying lubricant under a pressure greater than said superatmospheric pressure to said film retaining surface, and means for draining excess lubricant escaping along said shaft from either side of said film retaining surface, said draining means being constructed and arranged to drain lubricant only and prevent flow of expanded fluid to the outboard side of said partition.

2. An expansion turbine according to claim 1 in which said film retaining surface in the sealing means also acts as a shaft bearing.

3. An expansion turbine according to claim 1 in which a shaft bearing is mounted in said casing extension adjacent to and on the outboard side of said sealing sleeve.

4. In an expansion turbine for producing low temperature refrigeration and having an impulse wheel disposed within a casing and mounted on a long flexible shaft, a shaft bearing mounted in an extension of said casing about the shaft, said bearing being disposed at a substantial distance from the wheel; a partition near the wheel with an opening through which the shaft passes, said partition and extension defining an elongated space about the shaft containing quiescent expanded gas under superatmospheric pressure, the length of the space being sufficient to hold heat transfer from the bearing toward the wheel at a desired low value; a lubricant film retaining surface in said bearing completely surrounding a journal portion of said shaft; means for supplying liquid lubricant to said film retaining surface under a pressure greater than that of the expanded gas to maintain said film as a gas seal; and means for draining excess lubricant escaping along said shaft from either side of said film retaining surface, said draining means being constructed and arranged to drain lubricant only and prevent flow of expanded gas to the outboard side of said partition.

5. An expansion turbine according to claim 4 in which said bearing is mounted in a partition of said casing extension, said casing extension having another partition closely fitting said shaft on the inboard side of said bearing and forming a pocket between it and the bearing partition, the inboard side draining means being connected to drain said pocket.

PHILIP K. RICE.

REFERENCES CITED

The following references are of record in the file of this patent:

UNITED STATES PATENTS

| Number | Name | Date |
|---|---|---|
| 811,642 | Key | Feb. 6, 1906 |
| 813,723 | Longwell et al. | Feb. 27, 1906 |
| 1,057,656 | Miller et al. | Apr. 1, 1913 |
| 1,188,189 | Little | June 20, 1916 |
| 1,559,182 | Rice | Oct. 27, 1925 |
| 1,840,127 | Penney | Jan. 5, 1932 |
| 2,077,038 | Carrier | Apr. 13, 1937 |
| 2,133,879 | Thearle | Oct. 18, 1938 |
| 2,155,218 | Cain | Apr. 18, 1939 |
| 2,159,057 | Sterrett | May 23, 1939 |
| 2,205,892 | Teker | June 25, 1940 |